United States Patent
Army et al.

(10) Patent No.: US 8,601,826 B2
(45) Date of Patent: Dec. 10, 2013

(54) RECIRCULATION HEAT EXCHANGER OUTLET HEADER

(75) Inventors: Steven D. Army, Enfield, CT (US); Charles J. McColgan, West Granby, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 517 days.

(21) Appl. No.: 13/010,008

(22) Filed: Jan. 20, 2011

(65) Prior Publication Data

US 2012/0186282 A1     Jul. 26, 2012

(51) Int. Cl.
    *F25D 17/06*     (2006.01)

(52) U.S. Cl.
    USPC ........................................................... 62/93

(58) Field of Classification Search
    USPC ........ 62/86, 93, 150, 285, 291, 402, 426, 513
    See application file for complete search history.

(56) References Cited

U.S. PATENT DOCUMENTS

| | | | |
|---|---|---|---|
| 3,525,390 A * | 8/1970 | Rothman | 165/166 |
| 3,797,565 A * | 3/1974 | Fernandes | 165/111 |
| 4,187,090 A | 2/1980 | Bizzarro et al. | |
| 4,681,610 A * | 7/1987 | Warner | 55/394 |
| 5,800,582 A | 9/1998 | Palmer et al. | |
| 6,449,963 B1 | 9/2002 | Ng et al. | |
| 6,524,373 B2 | 2/2003 | Afeiche et al. | |
| 6,883,335 B2 | 4/2005 | Axe et al. | |
| 7,266,958 B2 | 9/2007 | Milde et al. | |
| 7,591,869 B2 | 9/2009 | Jensen et al. | |
| 7,691,185 B2 | 4/2010 | Darke et al. | |
| 2005/0061913 A1* | 3/2005 | McColgan et al. | 244/118.5 |
| 2009/0017742 A1 | 1/2009 | Diaks | |
| 2010/0323601 A1 | 12/2010 | Cremers et al. | |

* cited by examiner

*Primary Examiner* — Melvin Jones
(74) *Attorney, Agent, or Firm* — Kinney & Lange, P.A.

(57) ABSTRACT

An air cooling system includes a heat exchanger, an inlet duct, an outlet duct, and an outlet header. The inlet duct is fluidly connected to the heat exchanger and is configured to direct relatively warm air from the cabin into the heat exchanger. The outlet duct is fluidly connected to the heat exchanger and configured to direct relatively cool air out of the heat exchanger and back to the cabin. The outlet header is located between the heat exchanger and the outlet duct. The outlet header has a shape configured to collect water from the cool air.

20 Claims, 5 Drawing Sheets

US 8,601,826 B2

RECIRCULATION HEAT EXCHANGER OUTLET HEADER

BACKGROUND

The present disclosure relates generally to air conditioning systems, and more specifically to heat exchangers for cooling air in an airplane.

Airplane cabins require a constant flow of conditioned air. It is common to equip an airplane with an environmental control system for providing conditioned air to the cabin and other pressurized regions. Known environmental control systems can be further subdivided into an air cycle system responsible for obtaining fresh exterior air and an air recirculation system responsible for obtaining used cabin air. The air cycle system and air recirculation system commonly overlap at an air mixer where a portion of fresh exterior air is mixed with a portion of used cabin air to produce a mixed airstream for distribution to the cabin.

SUMMARY

An air cooling system for an airplane having a cabin is disclosed. The air cooling system includes a liquid to air heat exchanger, an inlet duct, an outlet duct, and an outlet header. The liquid to air heat exchanger has an air inlet and an air outlet. The inlet duct is fluidly connected to the air inlet and is configured to direct relatively warm air from the cabin into the heat exchanger. The outlet duct is fluidly connected to the air outlet and configured to direct relatively cool air out of the heat exchanger and back to the cabin. The outlet header is located between the air outlet and the outlet duct. The outlet header has a shape configured to collect water from the cool air.

A heat exchanger located in a crown of an airplane is also disclosed. The heat exchanger includes a liquid to air heat exchanging core, a liquid inlet, a liquid outlet, an air inlet, an air outlet, and an outlet header. The liquid inlet directs relatively cool liquid from an integrated cooling system to the heat exchanging core. The liquid outlet directs relatively warm liquid away from the heat exchange core back to the integrated cooling system. The air inlet directs relatively warm air from a cabin into the heat exchanging core. The air outlet directs relatively cool air from the heat exchanging core back to the cabin. The outlet header is attached to the air outlet. The outlet header has a shape configured to collect water from the relatively cool air as it exits the heat exchanger.

A method for removing water from recirculation air in an airplane having a cabin and a crown is also disclosed. The method includes ducting warm air from the cabin to a heat exchanger located in the crown and removing heat from the warm air to produce cool air exiting the heat exchanger. The method further includes separating water from the cool air with a flared outlet header to produce relatively moisture-free cool air and ducting the relatively moisture-free cool air to the cabin.

DETAILED DESCRIPTION

Figure 1:
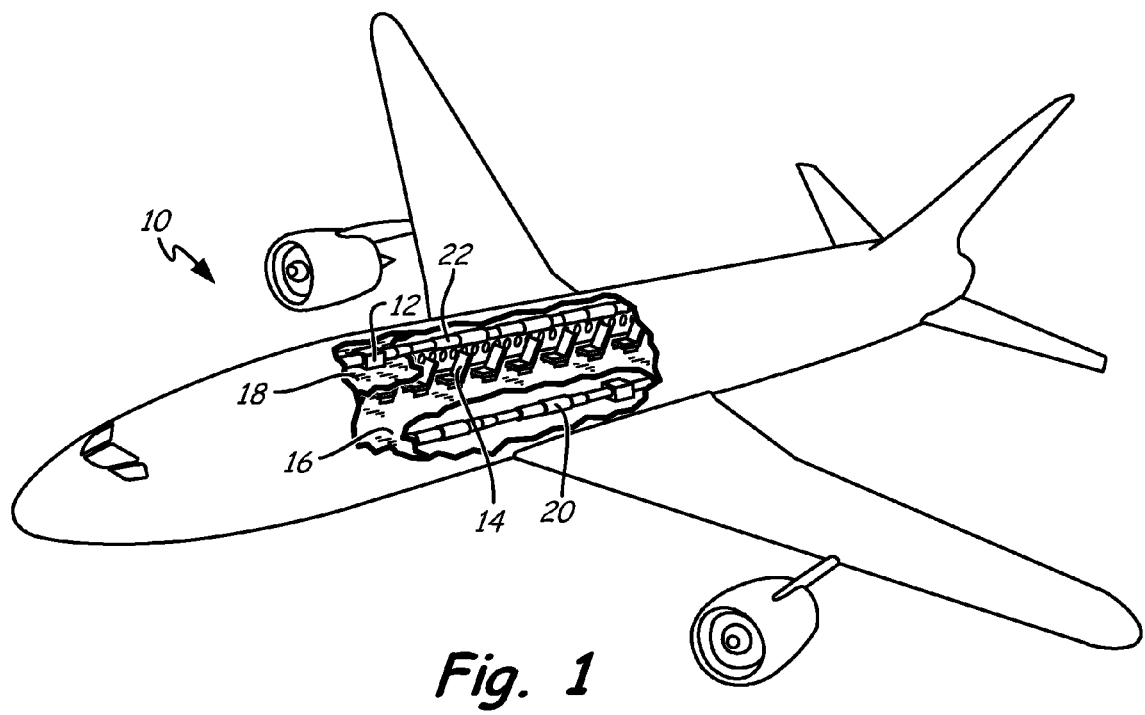
FIG. 1 is a cut-away view of an airplane having a heat exchanger in accordance with the present disclosure.

As used herein, the term "airplane" includes any type of aircraft having a cabin and recirculation system. FIG. 1 is a cut-away view of airplane 10 having heat exchanger 12 in accordance with the present disclosure. Airplane 10 includes passenger cabin 14 having floor 16 and ceiling 18. Located below floor 16 is lower ducting 20, and located above ceiling 18 is upper ducting 22, which is attached to heat exchanger 12. Air from cabin 14 is drawn into upper ducting 22 above ceiling 18 for cooling by heat exchanger 12 before being returned to cabin 14.

As shown in FIG. 1, airplane 10 is a commercial jetliner having cabin 14 for transporting passengers. Cabin 14 is defined at a bottom by floor 16 and at a top by ceiling 18. Heat exchanger 12 is attached to upper ducting 22 and is located in the area above ceiling 18, otherwise known as the "crown" of airplane 10. A first portion of used cabin air is drawn from a bottom of cabin 14 through floor 16 and into lower ducting 20. This first portion of used cabin air is ducted through lower ducting 20 to an unpressurized region of airplane 10 for mixing with fresh, conditioned air in an air mixer. A second portion of used cabin air is drawn from a top of cabin 14 through ceiling 18 and into upper ducting 22. This second portion of used cabin air is sent through upper ducting 22 and to heat exchanger 12 in the crown of the airplane, which is a pressurized region of airplane 10 like cabin 14. Heat exchanger 12 cools this second portion of relatively warm, used cabin air such that it becomes relatively cool, conditioned recirculation air. This recirculation air is then ducted from heat exchanger 12 through distribution ducting and directly back into cabin 14 for re-use by passengers.

Figure 2:
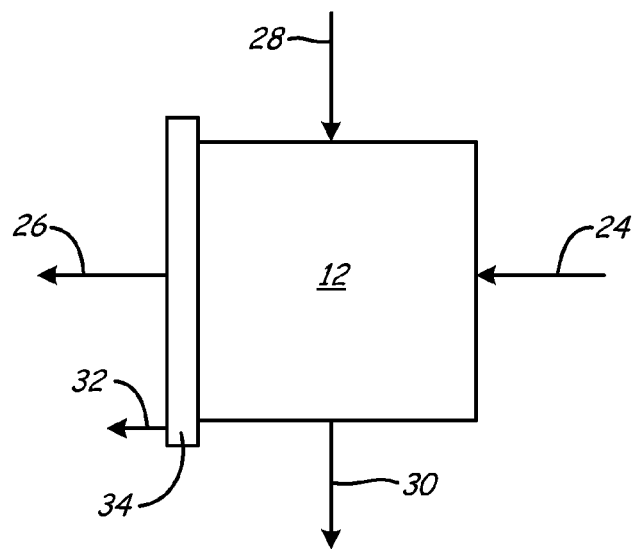
FIG. 2 is a schematic representation of fluid flow to and from the heat exchanger.

FIG. 2 is a schematic representation of fluid flow to and from heat exchanger 12. Depicted in FIG. 2 are warm air 24, cool air 26, cool liquid 28, warm liquid 30, water 32, and outlet header 34. Cool liquid 28 cools warm air 24 within heat exchanger 12 thereby producing cool air 26 and warm liquid 30. The cooling of warm air 24 into cool air 26 causes condensation, which is extracted from cool air 26 exiting heat exchanger 12 by outlet header 34 as water 32.

Heat exchanger 12 is a liquid to air heat exchanger for locally cooling cabin air, such as the second portion of used cabin air discussed with reference to FIG. 1. Used cabin air enters a first side of heat exchanger 12 as warm air 24. Warm air 24 is cooled within heat exchanger 12 and exits a second side of heat exchanger 12 as cool air 26. Cool air 26 is sent through distribution ducting and back to cabin 14 as a recirculation airstream. Cool liquid 28 from an integrated cooling system (ICS) enters a third side of heat exchanger 12. In the depicted embodiment, the liquid is propylene gylcol-water (PGW) that has been chilled by a vapor cycle and used to cool the galley cooling units before being sent to heat exchanger 12 as cool liquid 28. Within heat exchanger 12, warm air 24 rejects heat into cool liquid 28, which becomes warm liquid 30. Warm liquid 30 exits a fourth side of heat exchanger 12 and is piped back into the ICS. In the embodiment depicted, warm liquid 30 is sent from heat exchanger 12 to a condenser associated with the air cycle system in an unpressurized region of the airplane. Also exiting fourth side of heat exchanger 12, is water 32. The transformation of warm air 24 into cool air 26 produces condensation that is extracted by outlet header 34 as water 32. As cool air 26 with entrained moisture exits a fourth side of heat exchanger 12, it passes through attached outlet header 34 where water 32 is collected. Outlet header ensures that cool air 26 becomes relatively moisture-free before being ducted to cabin 14 for re-use.

Figure 3:
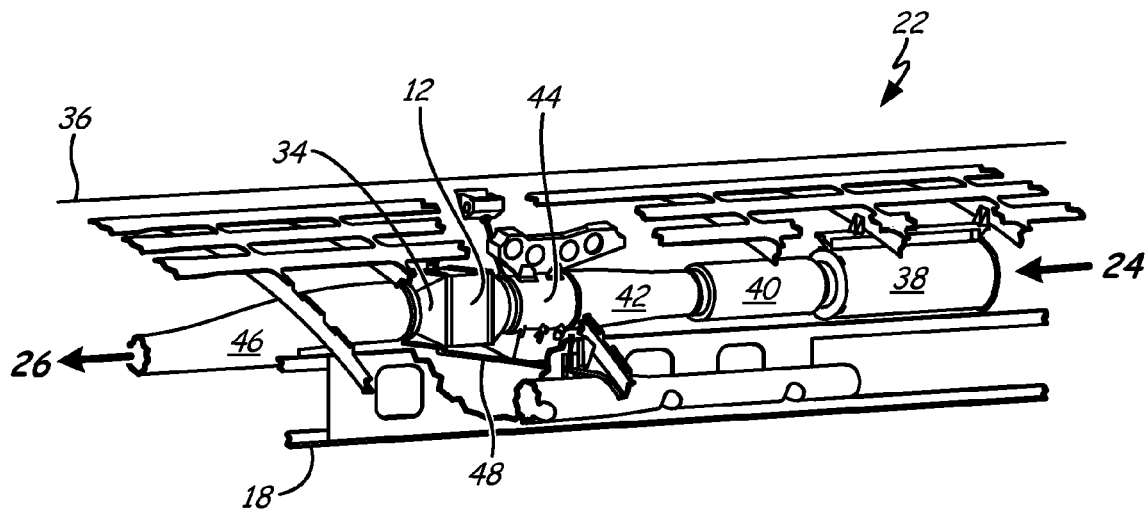
FIG. 3 is a perspective view of the heat exchanger and associated ducting.

FIG. 3 is a perspective view of heat exchanger 12 and upper ducting 22 in the crown of airplane 10. Depicted in FIG. 3 are heat exchanger 12, ceiling 18, upper ducting 22, warm air 24, cool air 26, outlet header 34, airplane skin 36, filter 38, muffler 40, inlet duct 42, fan 44, outlet duct 46, and drain line 48. Warm air 24 from cabin 14 enters upper ducting 22 and is cooled in heat exchanger 12 to become cool air 26, which exits upper ducting 22 for recirculation back to cabin 14.

Heat exchanger 12 and upper ducting 22 are located above ceiling 18 of cabin 14 and beneath skin 36 of airplane 10 in the pressurized crown region. Upper ducting 22 includes a plurality of components in flow series: filter 38, muffler 40, inlet duct 42, fan 44, and outlet duct 46. An inlet of filter 38 is attached to ducting that draws air up from cabin 14 and through ceiling 18. An outlet of filter 38 is attached to an inlet of muffler 40, and an outlet of muffler 40 is attached to an inlet of fan inlet duct 42. An outlet of fan inlet duct 42 is attached to an inlet of fan 44, and an outlet of fan 44 is attached to an inlet of heat exchanger 12. An outlet of heat exchanger 12 is attached to an inlet of outlet header 34, and an outlet of outlet header 34 is attached to an inlet of outlet duct 46. An outlet of outlet duct 46 is attached to distribution ducting for supplying air to cabin 14. Also shown in FIG. 3, is water line 48 attached to outlet header 34.

Warm air 24 from cabin 14 is drawn through ceiling 18 and into upper ducting 22 at the inlet of filter 38. In the depicted embodiment, filter 38 is a high efficiency particulate air (HEPA) filter that removes airborne particles from warm air 24. Next, warm air 24 passes through muffler 40 and noise associated with warm air 24 is reduced. Warm air 24 is then drawn through fan inlet duct 42 and fan 44 by the rotation of fan 44. Next, warm air 24 exits fan 44 and enters heat exchanger 12 for cooling. As described above with reference to FIG. 2, heat is rejected from warm air 24 to cool liquid 28 within heat exchanger 12, such that warm air 24 becomes cool air 26 and cool liquid 28 becomes warm liquid 30. As cool air 26 exits heat exchanger 12, outlet header 34 removes the entrained moisture. Relatively moisture-free and cool air 26 then flows from outlet header 34 through outlet duct 46 and into distribution ducting for re-use in cabin 14. Water 32 removed from cool air 26 by outlet header 34 and is drained away from outlet header 34 by water line 48. Removal of water 32 by outlet header 34 prevents condensation from entering cabin 14 with cool air 26 and "raining" on passengers.

Figure 4:
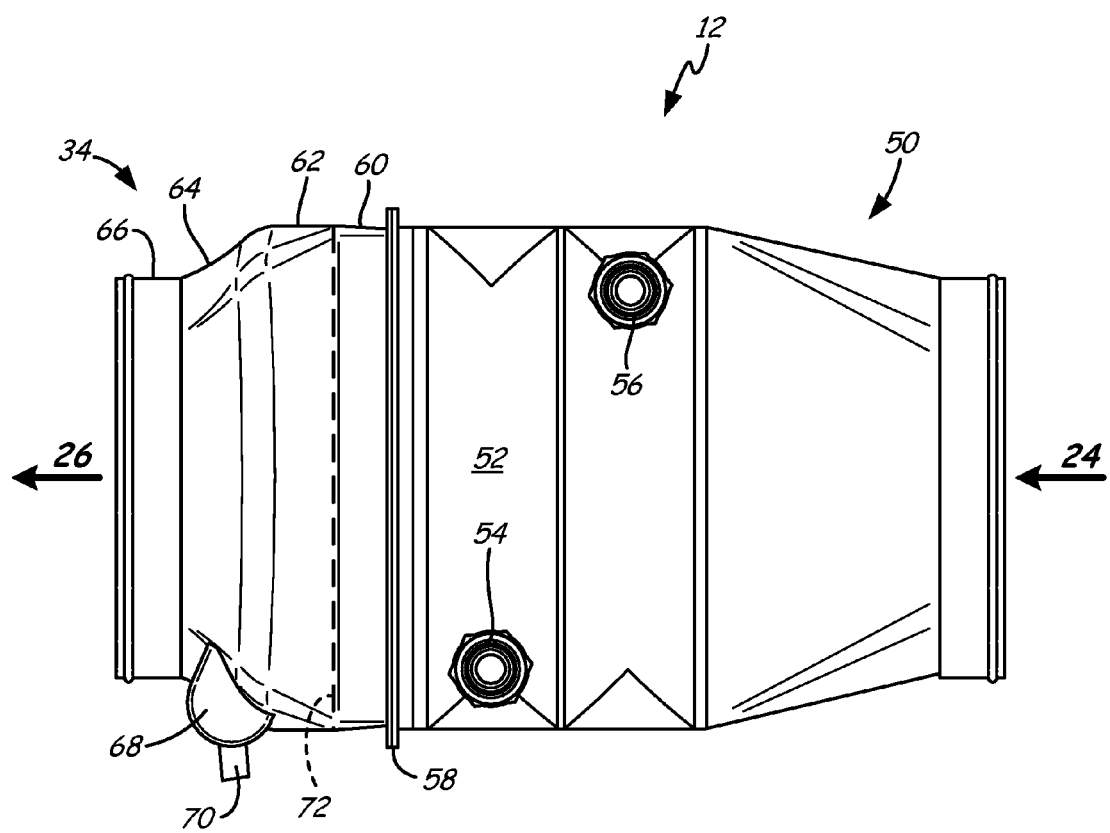
FIG. 4 is a side view of the heat exchanger having an outlet header.

FIG. 4 is a side view of heat exchanger 12 having outlet header 34. Depicted in Fig, 4 are heat exchanger 12, warm air 24, cool air 26, outlet header 34, and inlet header 50. Heat exchanger 12 includes core 52 fluid inlet 54 and fluid outlet 56. Outlet header 34 includes flange 58, flared portion 60, straight portion 62, tapered portion 64, lip 66, reservoir 68, drain 70, and coalescing element 72. Warm air 24 is cooled within heat exchanger 12 and exits as cool air 26, and entrained water is removed by outlet header 34.

Heat exchanger 12 includes core 52 located between inlet header 50 and outlet header 34. A first end of inlet header 50 is attached to fan 44 (shown in FIG. 3). A second, opposite end of inlet header 50 is attached to an air inlet side of core 52. A first end of outlet header 34 is attached to an air outlet side of core 52. A second, opposite end of outlet header 34 is attached to outlet duct 46 (shown in FIG. 3). Extending into core 52 of heat exchanger 12 are fluid inlet 54 and fluid outlet 56. Inlet header 50 and outlet header 34 are both tubular structures for containing and directing air either into or out of core 52. Warm air 24 travels through inlet header 50 before reaching core 52, and cold air 26 travels through outlet header 34 after rejecting heat to a cooling fluid within core 52. Cool fluid 28 enters core 52 through fluid inlet 54 and warm fluid 30 exits core 52 through fluid outlet 56. The heat exchange taking place within core 52 between warm air 24 and cool liquid 28 causes condensation to collect on cooling plates within core 52. As warm air 24 becomes into cool air 26, some condensation is entrained in cool air 26. Outlet header 34 is shaped to remove and collect water from cool air 26 as it exits core 52.

Outlet header 34 includes, in flow series, flange 58, flared portion 60, straight portion 62, tapered portion 64, and lip 66. Flange 58 is located at the first side of outlet header 34 and is attached to the air outlet side of core 52. Lip 66 is located at the second side of outlet header 34 and is attached to outlet duct 46 (shown in FIG. 3). Flange 58 can be bolted or welded to the air outlet side of core 52, depending on whether easy access for maintenance is desired. Reservoir or sump 68 has an upper, open end attached to a bottom side of both straight portion 62 and tapered portion 64 of outlet header 34. Attached to a lower end of reservoir 68 is drain 70, which is fluidly connected to water line 48 (shown in FIG. 3). Coalescing element 72 is optionally located within outlet header 34 between flared portion 60 and straight portion 62. Coalescing element 72 could include a screen, cloth, demister or any other structure configured to coalesce and aggregate water 32 being removed from cool air 26.

Cool air 26 exiting core 52 of heat exchanger 34 passes into flared portion 60 of outlet header 34. Flared portion 60 has about a 5 to 7 degree outward divergence or flare from flange 58 and core 52 to increase or "open up" the area of outlet header 34. Flared portion 60 acts like a diffuser in that it slows the flow rate of cool air 26 passing through flared portion 60. After flared portion 60, cool air 26 passes through straight portion 62, which maintains the larger area obtained in flared portion 60 and entices water 32 to form droplets and fall out of cool air 26. Cool air 26 then passes through converging or tapered portion 64 which reduces the area of outlet header 34 so it can attach to air outlet duct 44 at lip 66. Water 32 passively extracted from cool air 26 by the shape of outlet header 34 is collected in reservoir 68. Water 32 is directed away from reservoir 68 by drain 70 and water line 48 (shown in FIG. 3). Collected water 32 may be dumped overboard or used as a cooling fluid in a heat exchanger prior to being dumped overboard. If coalescing element 72 is present, water coalesces on coalescing element 72 before collection in reservoir 68. Relatively moisture-free cool air 26 exits outlet header 34 for immediate ducting to cabin 14 as a locally cooled recirculation air stream.

Figure 5:
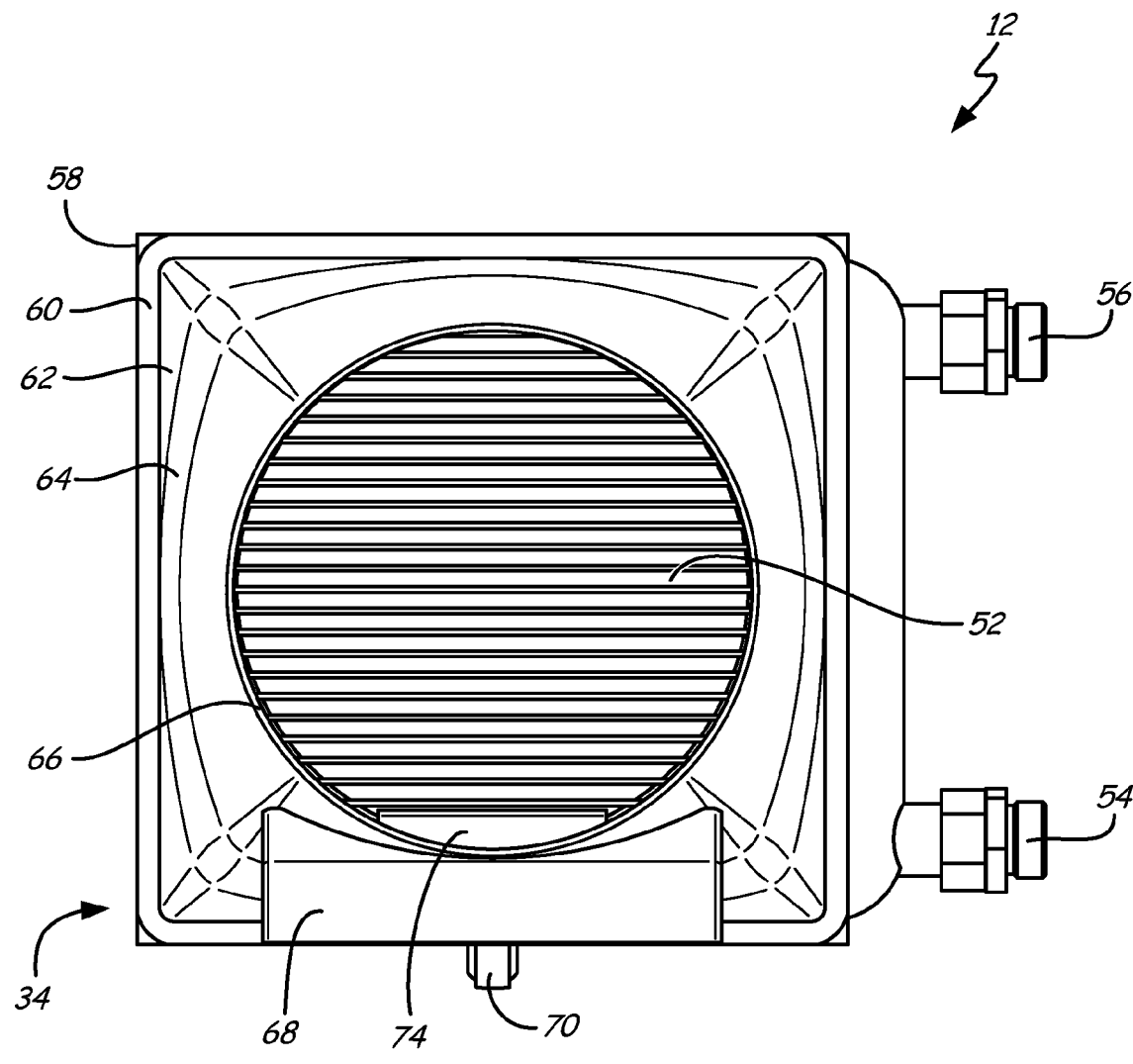
FIG. 5 is a back view of the heat exchanger having the outlet header.
Figure 6:
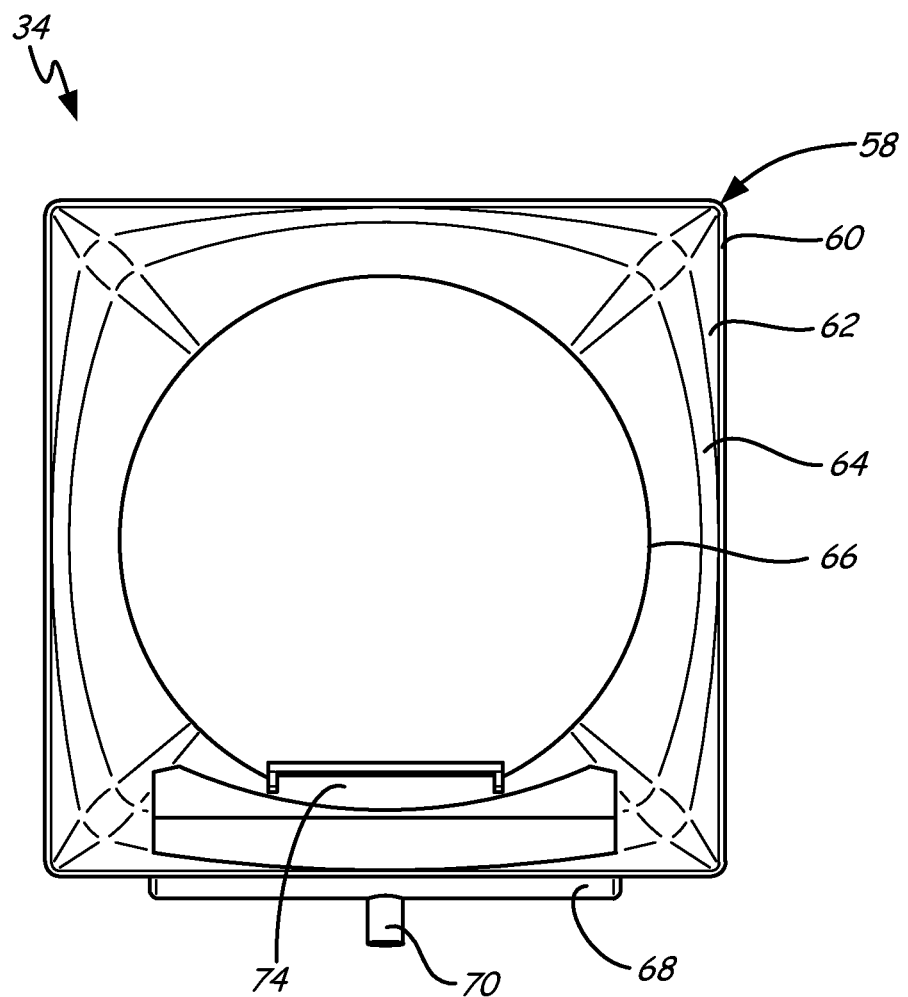
FIG. 6 is a front view of the outlet header removed from the heat exchanger.

FIG. 5 is a back view of outlet header 34 attached to heat exchanger 12 and FIG. 6 is a front view of outlet header 34 removed from heat exchanger 12. Depicted in FIG. 5 are heat exchanger 12, outlet header 34, core 52, fluid inlet 54, fluid outlet 56, flange 58, flared portion 60, straight portion 62, tapered portion 64, lip 66, reservoir 68, drain 70, and scupper 74. Depicted in FIG. 6 are outlet header 34, flange 58, flared portion 60, straight portion 62, tapered portion 64, lip 66, reservoir 68, drain 70, and scupper 74. Outlet header 34 is shaped to passively remove water 32 from cool air 26 as it exits core 52 of heat exchanger 12.

FIGS. 5 and 6 show many of the elements previously presented and discussed above with reference to FIG. 4. Heat exchanger 12 includes fluid inlet 54 on a bottom of a side panel and fluid outlet 56 above fluid inlet 54 on the same side panel. Outlet header 34 is attached to an outlet side of heat exchanger 12 by flange 58. From flange 58, outlet header flares outwardly away from a central axis to form flared portion 60. Flared portion 60 straightens out to become straight portion 62, and then tapers inwardly toward the central axis at tapered portion 64. Tapered portion 64 terminates at a radial innermost circular lip 66. Extending along a bottom of outlet header 34 is a substantially rectangular reservoir 68. Reservoir 68 includes an upper open end that is attached to both straight portion 62 and tapered portion 64, and a substantially closed lower end having a fluid opening for attachment to drain boss or drain 70. Also shown in FIGS. 5 and 6 is supper 74 extending upwardly from the top of reservoir 68 above lip 66. As described in detail above, moisture-laden cool air 26 exits heat exchanger 12 and enters outlet header 34. Outlet header 34 includes flared portion 60 for slowing the flow of cool air 26 and straight portion 62 for encouraging water 32 to form droplets and fall out of cool air 26. Water 32 falls into reservoir 68 for collection and relatively moisture-free cool air 26 travels out of outlet header 34 and into distribution ducting for immediate re-use by passengers in cabin 14. Scupper 74 extends upwardly into the flow of cold air 26 within outlet header 34 to prevent water 32 from being re-entrained in cold air 26. Accordingly, the shape of outlet header 34 passively separates water 32 from cold air 26 thereby preventing "the rain in the plane effect".

Although the present invention has been described with reference to preferred embodiments, workers skilled in the art will recognize that changes may be made in form and detail without departing from the spirit and scope of the invention.

The invention claimed is:

1. An air cooling system for an airplane having a cabin, the air cooling system comprising:
   a liquid to air heat exchanger having an air inlet and an air outlet;
   an inlet duct fluidly connected to the air inlet, the inlet duct configured to direct relatively warm air from the cabin into the heat exchanger;
   an outlet duct fluidly connected to the air outlet, the outlet duct configured to direct relatively cool air out of the heat exchanger and back to the cabin; and
   an outlet header located between the air outlet and the outlet duct, the outlet header having a shape configured to collect water from the cool air.

2. The air cooling system of claim 1, wherein the heat exchanger is located in a crown of the airplane.

3. The air cooling system of claim 1, further comprising:
   a recirculation fan located between the inlet duct and the air inlet of the heat exchanger.

4. The air cooling system of claim 1, further comprising:
   a HEPA filter connected to the inlet duct.

5. The air cooling system of claim 1, wherein the outlet header includes a flared portion between the air outlet and the outlet duct.

6. The air cooling system of claim 1, wherein the outlet header includes a water reservoir and drain.

7. A heat exchanger located in a crown of an airplane, the heat exchanger comprising:
   a liquid to air heat exchanging core;
   a liquid inlet for directing relatively cool liquid from an integrated cooling system to the heat exchanging core;
   a liquid outlet for directing relatively warm liquid away from the heat exchanging core back to the integrated cooling system;
   an air inlet for directing relatively warm air from a cabin into the heat exchanging core;
   an air outlet for directing relatively cool air from the heat exchanging core back to the cabin; and
   an outlet header attached to the air outlet, the outlet header having a shape configured to collect water from the relatively cool air as it exits the heat exchanging core.

8. The heat exchanger of claim 7, wherein the outlet header has a flared portion.

9. The heat exchanger of claim 8, wherein the flared portion flares outwardly from the air outlet approximately five to seven degrees.

10. The heat exchanger of claim 8, wherein the outlet header includes a straight portion downstream of the flared potion.

11. The heat exchanger of claim 10, wherein the outlet header includes an inwardly curved portion downstream of the straight portion.

12. The heat exchanger of claim 7, further comprising:
    a water reservoir attached to the outlet header; and
    a drain attached to the water reservoir.

13. The heat exchanger of claim 12, further comprising:
    a scupper extending upwardly from the water reservoir to prevent re-entrainment of water located in the water reservoir.

14. A method for removing water from recirculation air in an airplane having a cabin and a crown, the method comprising:
    ducting warm air from the cabin to a heat exchanger located in the crown;
    removing heat from the warm air to produce cool air exiting the heat exchanger;
    separating water from the cool air with a flared outlet header to produce relatively moisture-free cool air; and
    ducting the relatively moisture-free cool air to the cabin.

15. The method of claim 14, further comprising:
    filtering warm air from the cabin prior to removing heat.

16. The method of claim 14, further comprising:
    collecting water separated from the cool air with a water reservoir attached to the outlet header.

17. The method of claim 16, further comprising:
    blocking re-entrainment of water collected in the water reservoir with a scupper attached to the water reservoir.

18. The method of claim 17, further comprising:
    draining water collected in the water reservoir with a drain and drain line attached to the water reservoir.

19. The method of claim 14, further comprising:
    providing cool fluid from an integrated cooling system to the heat exchanger for removing heat from the warm air and thereby becoming warm fluid.

20. The method of claim 19, further comprising:
    returning warm fluid from the heat exchanger back to the integrated cooling system.

* * * * *